F. W. HARRIS.
PROCESS FOR DEHYDRATING PETROLEUM EMULSIONS.
APPLICATION FILED AUG. 1, 1919. RENEWED MAY 31, 1921.
1,405,126. Patented Jan. 31, 1922.
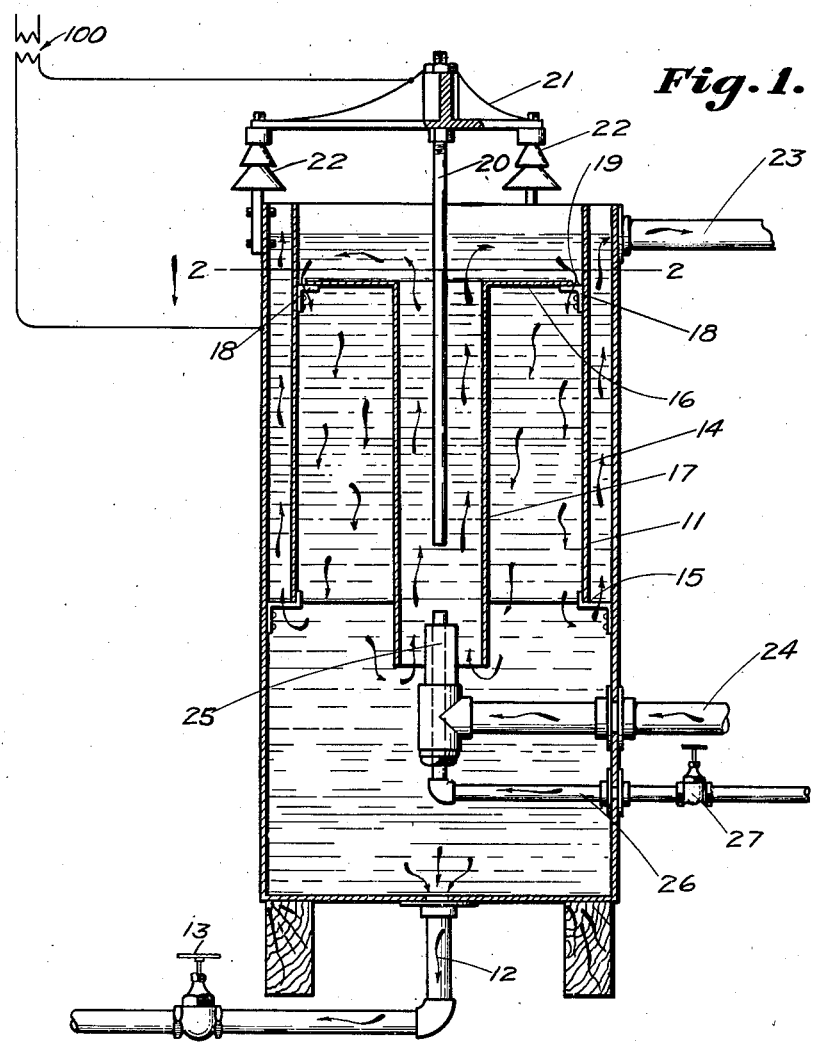
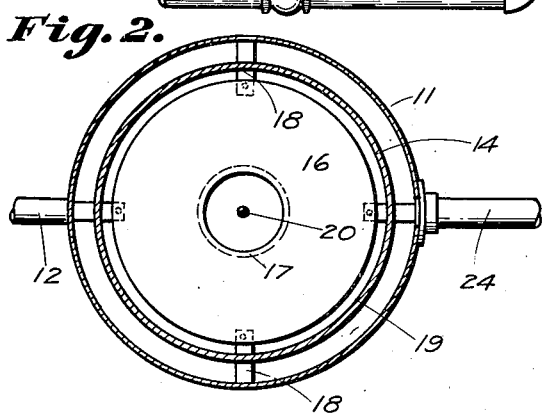
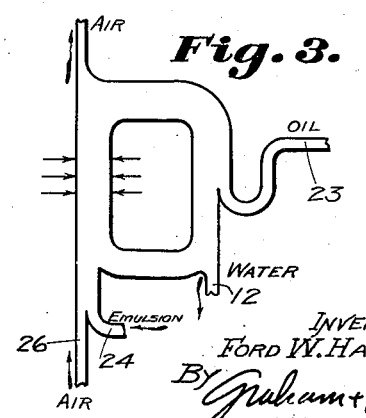
INVENTOR
FORD W. HARRIS,
BY
ATTORNEY.

UNITED STATES PATENT OFFICE.

FORD W. HARRIS, OF LOS ANGELES, CALIFORNIA, ASSIGNOR TO PETROLEUM RECTIFYING COMPANY, OF SAN FRANCISCO, CALIFORNIA, A CORPORATION OF CALIFORNIA.

PROCESS FOR DEHYDRATING PETROLEUM EMULSIONS.

1,405,126.     Specification of Letters Patent.     Patented Jan. 31, 1922.

Original application filed May 28, 1917, Serial No. 171,580. Divided and this application filed August 1, 1919, Serial No. 314,781. Renewed May 31, 1921. Serial No. 473,772.

*To all whom it may concern:*

Be it known that I, FORD W. HARRIS, a citizen of the United States, residing in Los Angeles, in the county of Los Angeles and State of California, have invented a new and useful Improvement in Processes for Dehydrating Petroleum Emulsions, of which the following is a specification.

My invention relates to the art of dehydrating petroleum oils by the use of an electric current. In this art the emulsion to be treated is brought between electrodes having an electric potential impressed thereon so that an electric current is caused to flow through the body of the emulsion. This current consolidates or agglomerates the fine water particles into larger globules which will readily settle out if the mixture of oil and water is allowed to stand.

Previous inventors have proposed to pass the fluid to be treated between a plurality of electrodes, between each pair of which an electric current is caused to pass so that the fluid in passing through the somewhat extended channels is repeatedly brought into successive electric fields and is repeatedly subjected to the action of successive currents. Such apparatus is somewhat expensive to construct and difficult to operate.

In my invention a single containing vessel is used, and a single electric field is employed, the body of the fluid in the containing vessel being repeatedly circulated through the single field so that it is repeatedly subjected to the action of the single field. By this means I obtain a large capacity at a small initial expense.

In the previous art, the emulsion in its passage through the prescribed channels is gradually broken so that it enters the treater having a considerable initial percentage of emulsion, and as it passes through the various conduits of the treater this emulsion is gradually broken down. In my invention a closed ring or path is formed in a considerable volume of fluid carried in the containing vessel, this ring having a very small proportion of emulsion therein. The fluid in this ring is continuously passing through the electric field and is continuously having its emulsion broken, is continuously dropping water, and is continuously having cleaned oil taken off and fresh raw fluid added thereto.

In my invention the entire dehydration takes place in a body of fluid having a very small proportion of emulsion. For example, if it is desired to break the emulsion to such an extent that only one per cent of emulsion is present in the final product, it is desirable to maintain the closed ring in such a condition that the average emulsion in the entire ring does not exceed two per cent. This allows high potentials and low currents to be used.

In this application I claim the process described in my application 171,580 filed May 28, 1917, of which this is a division.

In the drawings, which are for illustrative purposes only:

Fig. 1 is a sectional side elevation of one form of my invention.

Fig. 2 is a section on the line 2—2 Fig. 1 viewed in the direction of the arrows.

Fig. 3 is a diagrammatic representation of the process.

In the form of the invention illustrated in these drawings, shell 11 is provided having a water outlet pipe 12 controlled by a valve 13 connected into its lower end. A diversion shell 14 is placed inside the shell 11 extending from the extreme top thereof to a point 15 somewhat below the center of the shell 11. Secured inside the shell 14 is a plate 16 supporting an outer electrode 17. The plate 16 is supported on angle irons 18, and an opening 19 is left between the outer edge of the plate 16 and the inner surface of the shell 14.

Centrally secured inside the outer electrode 17 is an inner electrode 20, this electrode being supported in a casting 21 supported by insulators 22 on the top of the shell 11. A cleaned oil outlet pipe 23 connects into the top of the shell 11. An emulsion inlet pipe 24 connects with the side of the shell 11, being provided with an upward extending nipple 25 which extends inside the lower end of the outer electrode 17. An air pressure pipe 26 controlled by a valve 27 extends through the side of the shell 11 and up through the nipple 25 into the interior of the outer electrode 17.

The method of operation of the invention is as follows:

The shell 11 being filled with emulsion through the pipe 24, air is admitted to the interior of the outer electrode 17 through the pipe 26. By mixing this air with the oil and emulsion inside the outer electrode 17, an upward flow is caused in the direction of the arrows, the liquid rising through the outer electrode 17 and flowing downwardly through the opening 19 into the space between the shell 14 and the outer electrode 17. The constant upward flow of the oil inside the outer electrode 17 causes the emulsion to rapidly circulate in the direction of the arrows shown in Fig. 1. During this circulation, an electromotive force is impressed between the inner electrode 20 and the outer electrode 17, this being conveniently accomplished by the transformer 100 shown diagrammatically in Fig. 1. A current therefore flows between the electrode 17 and the electrode 20, and considerable of the liquid through which the current passes is vaporized or expanded, so that the tendency of the liquid to rise through the outer electrode 17 is further increased thereby.

After the apparatus is operating it is often possible to close the valve 27 and depend wholly on the action of the current to cause a circulation. During this circulation, emulsion is preferably introduced at a slow rate through the pipe 24, and cleaned oil is preferably withdrawn continuously through the pipe 23. The separated water will in a large measure settle in the bottom of the shell 11 and may be drawn off through the pipe 12.

I claim as my invention:

1. A process of dehydrating emulsions which consists in injecting the emulsion into a body of relatively dry emulsion; circulating said dry emulsion over a closed path between charged electrodes; withdrawing the precipitated water from the bottom of said body; and withdrawing the desired product from the top of said body.

2. That step in the art of dehydrating petroleum emulsions which comprises setting up a closed ring or path around which a relatively dry emulsion is circulated; subjecting the dry emulsion in said path to the action of an electric potential; injecting the oil to be dehydrated into said path; withdrawing precipitated water from said path; and withdrawing the desired product from said path.

In testimony whereof, I have hereunto set my hand at Los Angeles, California, this 21 day of July, 1919.

FORD W. HARRIS.